United States Patent
Cording et al.

(10) Patent No.: US 9,863,676 B2
(45) Date of Patent: Jan. 9, 2018

(54) METHOD AND EQUIPMENT FOR SERVICING COOLING SYSTEMS IN VEHICLES

(71) Applicant: Mahle International GmbH, Stuttgart (DE)

(72) Inventors: Louis Cording, Sonderborg (DK); Bjarne Lund, Sonderborg (DK)

(73) Assignee: Mahle International GmbH, Stuttgart (DE)

( * ) Notice: Subject to any disclaimer, the term of this patent is extended or adjusted under 35 U.S.C. 154(b) by 40 days.

(21) Appl. No.: 14/620,164

(22) Filed: Feb. 11, 2015

(65) Prior Publication Data

US 2015/0153084 A1     Jun. 4, 2015

Related U.S. Application Data

(62) Division of application No. 13/512,492, filed as application No. PCT/DK2010/000161 on Nov. 30, 2010, now Pat. No. 8,955,341.

(30) Foreign Application Priority Data

Dec. 1, 2009 (DK) .................................. 2009 01272
Apr. 19, 2010 (DK) .................................. 2010 00322
Sep. 13, 2010 (DK) .................................. 2010 00819

(51) Int. Cl.
*F25B 45/00* (2006.01)
*B60H 1/00* (2006.01)

(52) U.S. Cl.
CPC ......... *F25B 45/00* (2013.01); *B60H 1/00257* (2013.01); *B60H 1/00585* (2013.01); *F25B 2345/0052* (2013.01)

(58) Field of Classification Search
CPC . B60H 1/00257; B60H 1/00585; F25B 45/00; F25B 2345/0052; F25B 45/006; F25B 2345/001; F25B 2345/006
(Continued)

(56) References Cited

U.S. PATENT DOCUMENTS 3,089,853 A  5/1963  Pethrick et al.
4,538,964 A  9/1985  Brown
(Continued)

FOREIGN PATENT DOCUMENTS

CN     201363976 Y    12/2009
DE   202005019890 U1   5/2006
(Continued)

OTHER PUBLICATIONS

English Abstract for EP 1515041A1.
(Continued)

*Primary Examiner* — Mohammad M Ali
(74) *Attorney, Agent, or Firm* — Fishman Stewart PLLC

(57) ABSTRACT

When, according to the invention, the air in the so-called Zone 2 areas is ventilated, i.e. sucked out, the ATEX Directive concerning treatment of inflammable coolants may be satisfied in an effective manner. In practice, the suction around the engine (6) of the vehicle and the ventilation of the service equipment (9, 21, 53), respectively, may ensure that the requirements in the ATEX Directive with respect to Zone 2 areas may be satisfied, if possibly inflammable vapors are discharged, since these areas are ventilated to the atmosphere. The use of the method is service-friendly when servicing air conditioning systems and when adding coolant online.

17 Claims, 3 Drawing Sheets

Figure 1:
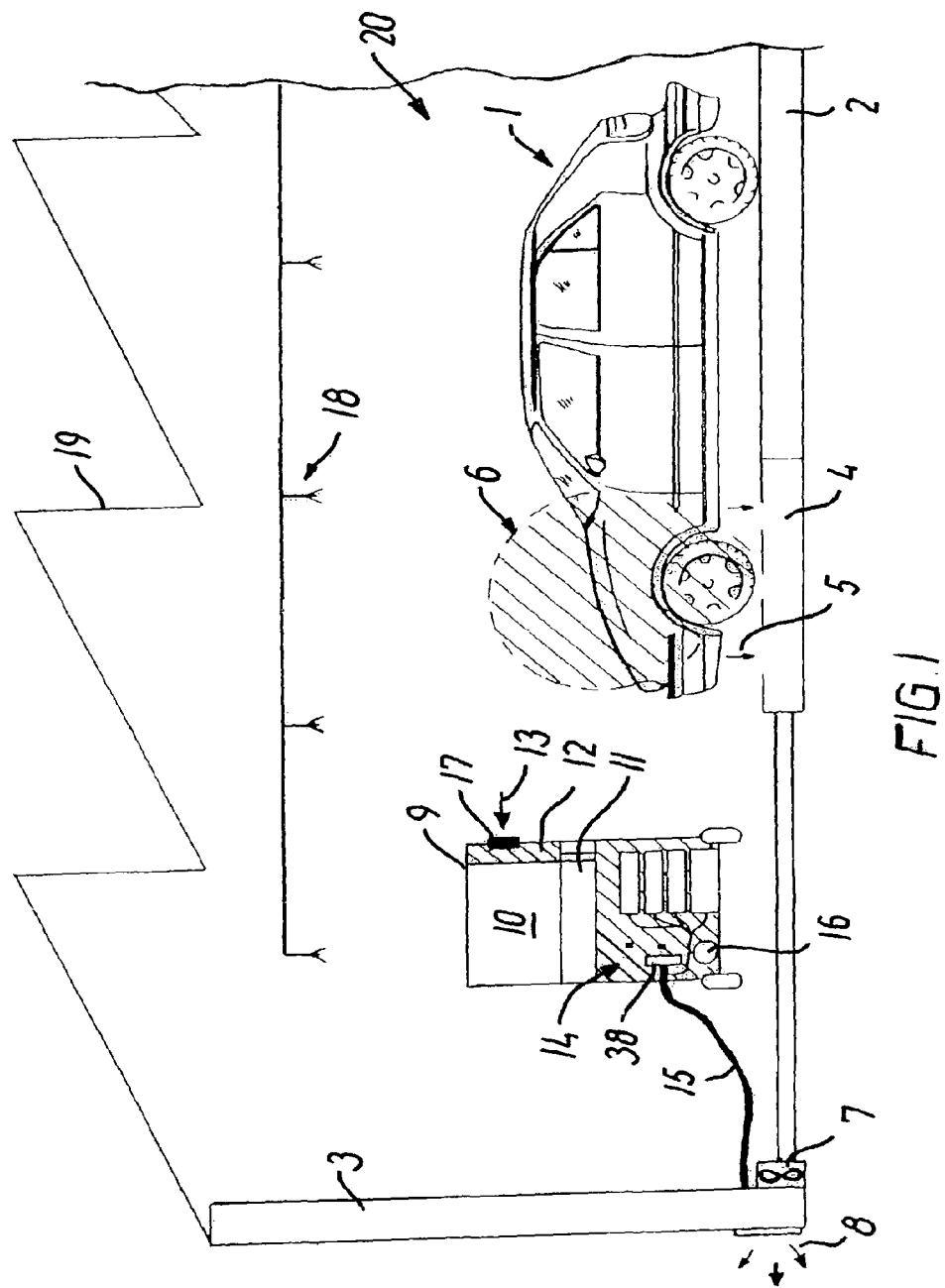

(58) Field of Classification Search
USPC .................................................. 62/292, 149
See application file for complete search history.

(56) References Cited

U.S. PATENT DOCUMENTS

| | | | |
|---|---|---|---|
| 4,643,476 A * | 2/1987 | Montgerard | B60P 3/14 144/286.1 |
| 4,981,318 A * | 1/1991 | Doane | B60P 3/14 296/182.1 |
| 5,161,385 A | 11/1992 | Schumacher | |
| 5,375,426 A | 12/1994 | Burgener | |
| 5,833,294 A * | 11/1998 | Williams | B60S 5/00 296/24.32 |
| 6,196,008 B1 * | 3/2001 | Fujitaka | F24F 1/0003 62/149 |
| 6,314,749 B1 | 11/2001 | Van Steenburgh, Jr. | |
| 6,425,252 B1 * | 7/2002 | Kobayashi | F17C 13/002 62/292 |
| 6,449,962 B1 * | 9/2002 | Takemasa | F25B 45/00 62/292 |
| 2003/0140779 A1 | 7/2003 | Schwarzkopf et al. | |
| 2005/0066679 A1 | 3/2005 | Boyer et al. | |
| 2006/0196334 A1 | 9/2006 | Chen | |
| 2007/0108403 A1 | 5/2007 | Sievert et al. | |
| 2007/0187638 A1 | 8/2007 | Guilpain et al. | |
| 2008/0214022 A1 * | 9/2008 | Kowalick | H01R 13/6397 439/34 |
| 2008/0308133 A1 * | 12/2008 | Grubb | B60S 3/004 134/72 |
| 2009/0188263 A1 | 7/2009 | Murray et al. | |
| 2009/0203306 A1 * | 8/2009 | Sugata | B60S 5/00 454/234 |
| 2010/0158732 A1 | 6/2010 | Sato et al. | |

FOREIGN PATENT DOCUMENTS

| | | |
|---|---|---|
| DE | 202006001376 U1 | 6/2007 |
| EP | 0472854 A1 | 3/1992 |
| EP | 0768198 A2 | 4/1997 |
| EP | 1515041 A1 | 3/2005 |
| JP | 2006271634 A | 10/2006 |
| JP | 2008061702 A | 3/2008 |
| WO | WO-89/05428 A2 | 6/1989 |

OTHER PUBLICATIONS

English Abstract for JP 2008061702A.
English Abstract for JP 2006271634A.
International Search Report for PCT/DK2010/000161, dated Mar. 2, 2011.
ATEX Directive No. 94/9/EU.
English abstract provided for CN-201363976.
English translation of CN office action for CN-2011800438171 dated Jul. 3, 2014.

* cited by examiner

METHOD AND EQUIPMENT FOR SERVICING COOLING SYSTEMS IN VEHICLES

CROSS-REFERENCES TO RELATED APPLICATIONS

This application is a division of U.S. patent application Ser. No. 13/512,492 (U.S. Pat. No. 8,955,341), filed Aug. 7, 2012. U.S. patent application Ser. No. 13/512,492 is a National Phase Application of PCT/DK2010/000161 filed on Nov. 30, 2010, which claims priority to Denmark Patent Application Nos. PA 2009 01272, filed Dec. 1, 2009, PA 2010 00322, Apr. 19, 2010, and PA 2010 00819, Sep. 13, 2010. The contents of all of these applications are hereby incorporated by reference in their entirety.

THE PRIOR ART

The invention relates to a method of servicing cooling systems in vehicles, said servicing comprising suction, cleaning and subsequent adding of coolant to the air conditioning system, said coolant comprising inflammable coolants, as well as equipment and use thereof.

Today, air conditioning systems in vehicles contain coolants which are not inflammable, and, therefore, servicing, i.e. suction, cleaning and adding of the coolant, may take place without any need for special safety measures.

However, these known coolants are a risk to the environment, since, when being discharged, they involve an increased greenhouse effect.

Therefore, it is endeavoured to provide alternative coolants which do not increase the greenhouse effect, and coolants are being developed which, however, are inflammable. This means that these new coolants cannot be serviced by the known methods, but require special safety measures in accordance with the ATEX Directive No. 94/9/EU. It is a matter of safety zones in the area around the inflammable vapours which are possibly discharged.

THE OBJECT OF THE INVENTION

It is the object of the invention to provide methods which satisfy the ATEX Directive using inflammable media, such as inflammable coolants, and this is achieved according to the invention by a method of servicing, where the areas in which there is a risk of leakage of inflammable agents, such as the area around the engine of the vehicle as well as the service equipment necessary for the servicing, are ventilated, so that the air in these areas is sucked out and discharged from the areas.

It is ensured in this manner that the areas in which there is a risk of occurrence of inflammable liquids, vapours, are reduced to comprise solely these inflammable zones, and therefore, it is possible to provide ventilation in a simple manner by suction and thus safe removal of inflammable components, which are discharged outside the service area via channels. Hereby, the safety requirements in the so-called Zone 2 area may be met in accordance with the Directive, thus making it possible in practice to service these inflammable coolants.

When, as stated in claim 2, the Zone 2 area around the engine of the vehicle is sucked out via a suction chamber or channel disposed below the engine, the safety requirements may be met, without this involving inconvenience to the service work in general.

When, as stated in claim 3, the Zone 2 area is ventilated around the service equipment, i.e. the equipment which sucks, cleans and adds coolant, and which is enclosed in a cabinet, the interior of this may be ventilated, which ensures that this zone, too, meets the safety requirements, without causing inconvenience to the service work in general.

When, as stated in claim 4, the method is applied to a filling station, which comprises the equipment necessary for the adding of coolant, and this is encapsulated in a cabinet which is sucked out, the Zone 2 requirements will be met, without the service work being impeded or rendered difficult by this.

When, as stated in claim 5, the equipment is controlled partly by subjecting it to vacuum, partly to pressure, it is ensured that the system is tight under all pressure conditions.

When, as stated in claims 6-9, the service equipment is provided in a ventilated cabinet with the necessary components, and the air is discharged from the cabinet via a hose to the exterior of the service building, an effective suction is achieved, and thereby a safely exhausted Zone 2 area around the service equipment.

Finally, as stated in claims 10 and 11, it is expedient to use the method for both servicing of air conditioning systems and for adding coolant on a production line.

THE DRAWING

Figure 2:
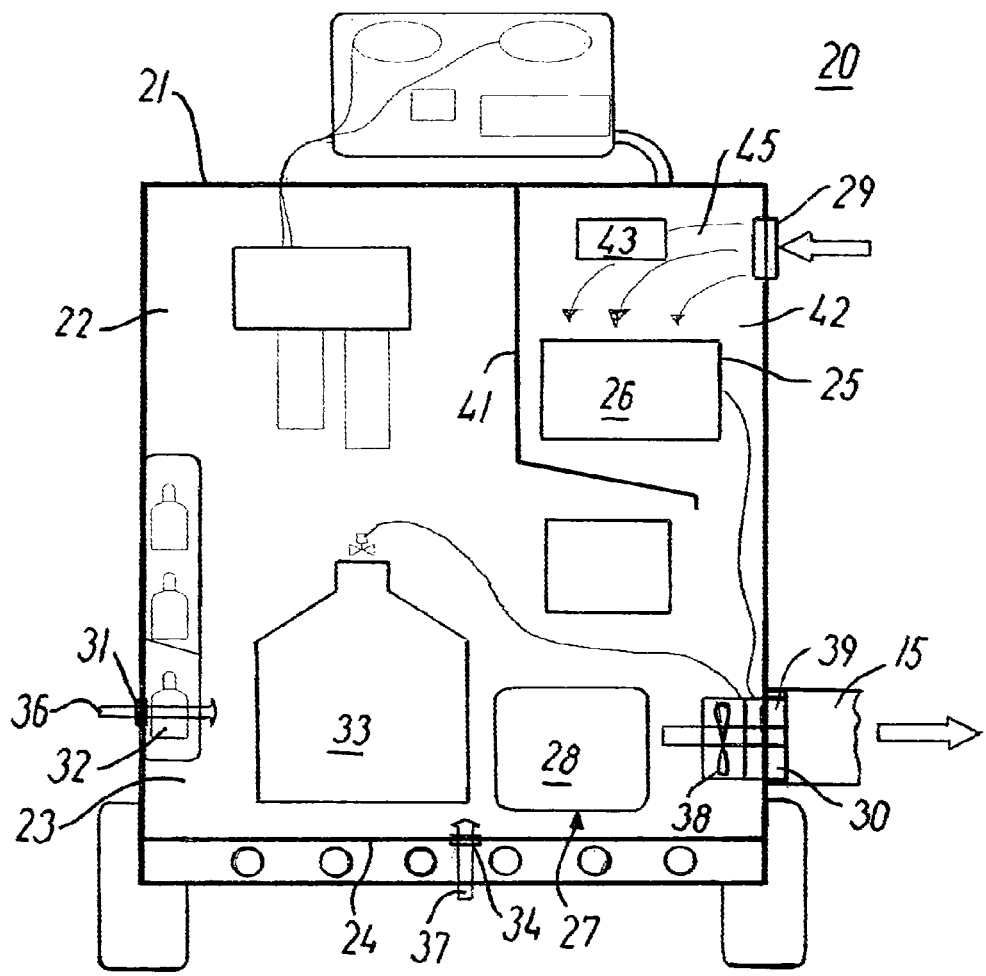
Figure 3:
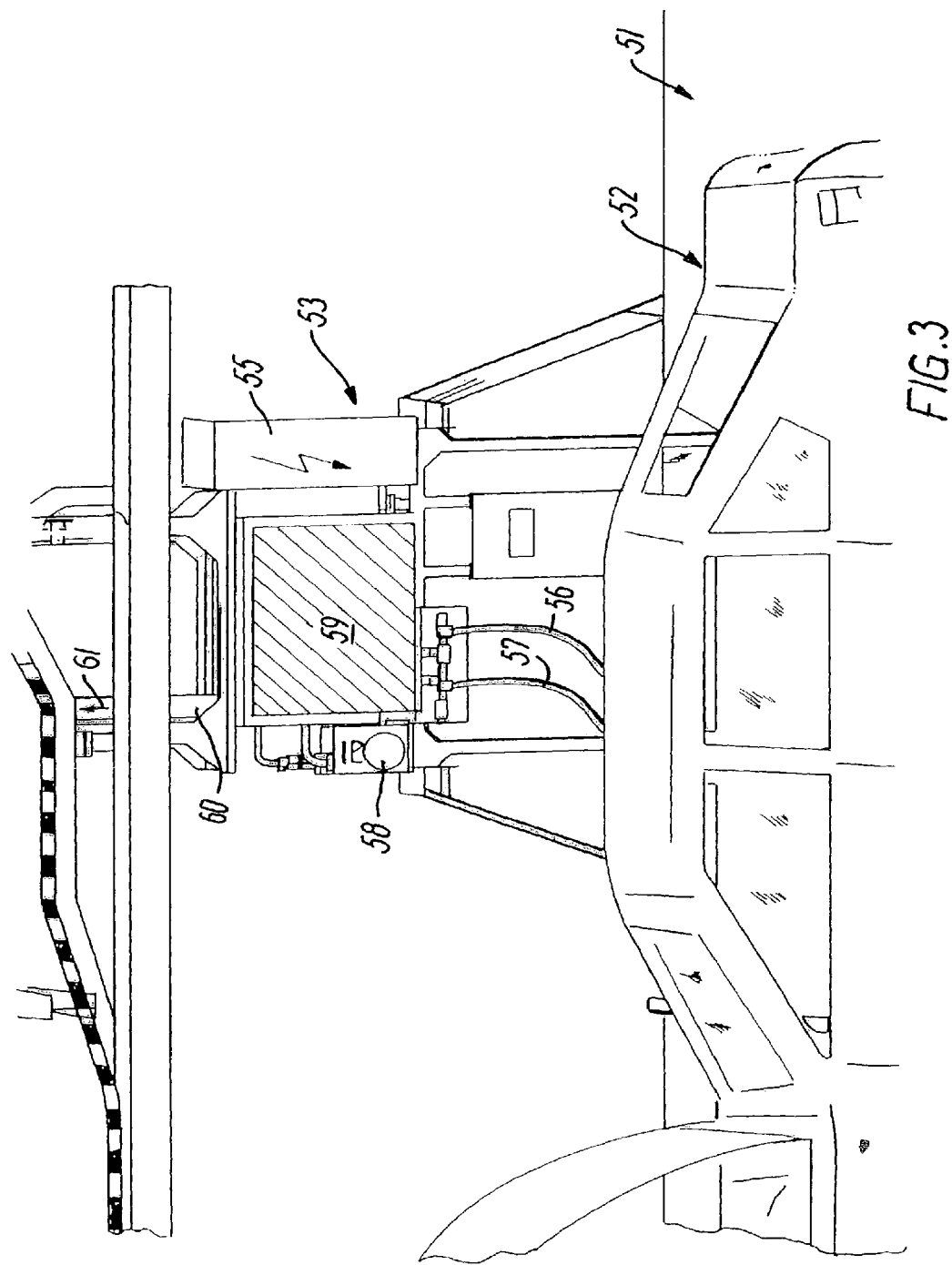

The method and the use thereof will be described more fully below with reference to the drawing, in which FIG. 1 shows a system for servicing a vehicle, with the Zone 2 area indicated by hatching, FIG. 2 shows a sectional view of service equipment with incorporated ventilator, and FIG. 3 shows adding of coolant on a production line, in which the Zone 2 area is likewise hatched.

DESCRIPTION OF WORKING EXAMPLES

The first example is a method of servicing a cooling system in a vehicle 1, as shown in FIG. 1.

The vehicle is shown disposed in a space 20 in a service building or the like with a roof 19 and walls 3. A sprinkler system with nozzles 18 is shown at the top.

The vehicle 1 is disposed such that the engine compartment is present above a suction trough 4. In the example shown, it is a front engine, but, of course, it might also be a rear engine.

The suction trough 4 is provided with inlet openings at the top, so that air from the space 20 may be sucked out, as indicated by arrows 5.

The suction takes place via a blower or ventilator 7, whose outlet side provides discharge of the air outside the wall 3, as indicated by arrows 8.

In the example shown, the service system is constructed as a wheeled cabinet 9. At the top of this cabinet, there is a room 10 for the electrical control, etc., at the side a room 12 for the service equipment, such as coupling parts, etc, and beneath a room 11 for components and the like. Various components are shown at the bottom of the system, such as a vacuum pump, a liquid container, etc., and also a differential pressure meter 16.

The cabinet 9 is partly ventilated, as air from the space 20 may be admitted through an opening 17 in the cabinet 9, as indicated by an arrow 13, so that the space shown hatched may be evacuated by means of a ventilator 38, via a suction hose 15, and the air is discharged from the service space 20, as indicated by arrows 8 in FIG. 1.

The service unit, as shown in FIG. 2, has a housing configured as a wheeled cabinet 21, with an interior with an upper 22 and a lower part 23 beneath the upper part 22, and with a bottom 24. Inside the cabinet 21, components are arranged for an emptying mechanism 25 for exhausting coolant or a compressor oil mixture from the cooling system, e.g. a vacuum pump 26, and components for a filling mechanism 27 for refilling a closed cycle of the cooling system e.g. a compressor 28.

A first air inlet opening 29 is provided on the upper part 22 of the cabinet 21, and a discharge opening 30 is provided on the lower part 23. In addition to the first part air inlet opening 29, a second air inlet opening 31 is provided, which is in front of a waste oil bottle 32. For instance, an internal cylinder 33 and the compressor 28 are arranged on the bottom 24 in the interior of the cabinet 21. Also a third inlet opening 34 is arranged in the bottom 24.

The interior of the cabinet 21 is ventilated by a ventilation system, as air from the outside space 20 around the cabinet 21 may be admitted through the air inlet openings 29, 31, 34 into the interior of the cabinet 21, as indicated by arrows 35 and 36 and by an arrow 37. It is also possible that more than three inlet openings may be provided.

The ventilation system comprises a ventilator 38 inside the cabinet 21. The ventilator 38 is arranged in front of the discharge opening 30. The outside of the cabinet 21 has arranged thereon a flange 39 around the discharge opening 30 for the fastening of a hose 15. Thereby, the air or inflammable gas or vapours are pressed out of the interior of the cabinet 21 by the blast pressure of the ventilator 38, as indicated by an arrow 40.

For a better flow of the fresh air behind the inlet opening 29, there is provided a guide sheet 41, which separates a zone 42 with electrical components, such as an electrical power supply 43 and the vacuum pump 26, from the whole area on the upper part 22. In order to eliminate the zone 42 around the electrical components 43 and the vacuum pump 28, the flow of fresh air is configured in such a way that fresh air shown by the arrow 35 from the outside of the service unit is sucked into the cabinet 21 through the first inlet opening 29 and thereby passes the electrical components 43 and the vacuum pump 26 in the area 42, as shown by arrows 45. In addition, in order to eliminate the inflammable zone around the internal cylinder 33 and the compressor 28 and the waste oil bottle 32, fresh air, as shown by arrows 36 and 37 are sucked from the outside of the service unit into the interior, thereby passing the components on the bottom 24, e.g. the internal cylinder 33 and the compressor 28 and the waste oil bottle 32 on the side wall.

The discharge opening 30 is connected with a hose 15 for discharging air from the interior of the cabinet 21 outside a service space, as shown by an arrow 8 in FIG. 1. The ventilator 38 acts such that fresh air from the outside of the service unit is sucked into the interior of the service unit through the inlet openings 29, 31, 34 and is pressed out through the discharge opening 30 and through the hose 15 outside a service building. Thereby, air contaminated with inflammable coolant, which may escape in the interior of the service unit 21, is pressed out of the interior of the service unit 21. Therefore, the contaminated air inside the cabinet is handled correctly.

With this equipment, the method according to the invention may be carried out in a such a manner that the ATEX Directive may be satisfied with the safety requirements which are made, as indicated in the shown example by the hatching, viz. a Zone 2 of minimum 1 meter around the engine and a Zone 2 in the cabinet 9, 21. Inflammable vapours from liquids, which may be ignited, may occur in these zones at servicing and perhaps because of leakages, etc.

By means of the ventilation possibilities described, viz. partly below the engine, partly through the cabinet, the requirements of the ATEX Directive may be met, without this causing work-related problems.

Now, the equipment shown in FIG. 3 will be described.

In the example shown, an air conditioning system is to be filled with an inflammable coolant in a so-called online production line, where the vehicle 52 is advanced on a belt 51.

FIG. 3 shows a filling station 53 as a suspension for a cabinet comprising an electrical cabinet 55, a classified and ventilated room 59, which is hatched to indicate that it is a Zone 2 room, a liquid pump 58 as well as a high pressure line 56 and a low pressure line 57 for a filling adaptor (not shown).

It is noted that with this production line there is no Zone 2 around the engine, as the zone is exclusively present inside the ventilated room 59 and the lines 56 and 57.

The Zone 2 area 59 in the cabinet is connected with a ventilation system at the top via a ventilation channel 60, so that the air present in the cabinet 59 may be sucked out, as indicated by arrows 61. It is ensured thereby that the cabinet satisfies the safety zone requirements in accordance with the ATEX Directive.

The online filling may therefore take place in a safe manner, without this involving any inconvenience to the work.

For the control of the system, including the tightness of the couplings, the filling system may be subjected to partly a vacuum, partly a positive pressure with a view to controlling its tightness. Hereby, it is ensured in a simple manner that the system is completely tight under all conditions of operation.

The equipment according to the invention may readily be installed in existing service systems, as this does not require material changes, but just installation of the necessary ventilation equipment.

The invention claimed is:

1. A service equipment for servicing an air conditioning system in a motor vehicle, comprising:
   a closed cabinet for accommodating at least a filling system for adding inflammable coolant to the air conditioning system of the motor vehicle; and
   a ventilation system having at least one channel for removing air from the interior of the closed cabinet;
   wherein the closed cabinet includes a guide sheet within an interior of the closed cabinet that separates a portion of the closed cabinet housing electrical components from the remaining portion of the closed cabinet, the guide sheet directing air entering the interior from an air inlet opening to pass the electrical components.

2. The service equipment according to claim 1, wherein the ventilation system includes an internal ventilator which is (i) disposed inside the cabinet and (ii) coupled to a discharge channel hose.

3. The service equipment according to claim 1, wherein:
   an air inlet is arranged in an upper part of the cabinet;
   a discharge opening is arranged in a lower part of the cabinet;
   the discharge opening is connected with a hose for discharging air from the interior of the cabinet to the exterior.

4. The service equipment according to claim 1, wherein:
the ventilation system includes a ventilator which is coupled to at least one of (i) a discharge opening in the cabinet via a hose and (ii) a suction station for suctioning out air from an area around an engine of the motor vehicle.

5. A system for servicing an air conditioning system in a motor vehicle, comprising:
a housing having a service space in which the motor vehicle is positionable and a suction trough positioned within the service space such that an engine of the motor vehicle is positionable above the suction trough;
a closed cabinet for exhausting at least one of a coolant or a compressor oil mixture from the air conditioning system; and
a filling station for adding inflammable coolant to the air conditioning system of the motor Vehicle;
wherein the closed cabinet has at least one air inlet into an interior of the closed cabinet and a ventilator connected with a hose configured to exhaust air from an interior of the closed cabinet to outside of the service space; and
wherein the closed cabinet includes a guide sheet within the interior of the closed cabinet that separates a portion of the closed cabinet housing electrical components from the remaining portion of the closed cabinet, the guide sheet directing air entering the interior from the at least one air inlet opening to pass the electrical components.

6. The system according to claim 5, wherein the filling station comprises a closed cabinet and a ventilation system having at least one channel for removing air from an interior of the closed cabinet to outside of the service space.

7. The system according to claim 5, wherein the at least one air inlet includes an air inlet opening provided in an upper part of the closed cabinet, and an air inlet opening arranged in a bottom of the closed cabinet.

8. The system according to claim 5, further comprising a waste oil bottle arranged in the interior of the closed cabinet, wherein the at least one air inlet is provided in front of the waste oil bottle.

9. The system according to claim 5, wherein:
at least one air inlet is arranged in an upper part of the closed cabinet;
at least one discharge opening is arranged in a lower part of the cabinet; and
the at least one discharge opening is connected with a hose for discharging air from an interior of the closed cabinet to outside of the service space.

10. The system according to claim 5, further comprising a belt configured to advance the motor vehicle within the service space.

11. The system according to claim 5, wherein the closed cabinet is a wheeled cabinet.

12. The system according to claim 5, wherein the fill station is suspended within the service space.

13. A service equipment for servicing an air conditioning system in a motor vehicle, comprising a closed cabinet for exhausting at least one of a coolant and a compressor oil mixture from the air conditioning system, the closed cabinet having at least one air inlet into an interior of the closed cabinet, at least one discharge opening to an exterior of the closed cabinet, and a ventilator at the discharge opening connected with a hose configured to exhaust air from the interior to the exterior of the closed cabinet;
wherein the closed cabinet includes a guide sheet within the interior of the closed cabinet that separates a portion of the closed cabinet housing electrical components from the remaining portion of the closed cabinet, the guide sheet directing air entering the interior from the at least one air inlet opening to pass the electrical components.

14. The service equipment according to claim 13, wherein the at least one air inlet includes an air inlet opening provided in an upper part of the closed cabinet, and an air inlet opening arranged in a bottom of the closed cabinet.

15. The service equipment according to claim 13, further comprising a waste oil bottle arranged in the interior of the closed cabinet, wherein the at least one air inlet is provided in front of the waste oil bottle.

16. The service equipment according to claim 13, wherein:
the at least one air inlet is arranged in an upper part of the closed cabinet; and
at least one discharge opening is arranged in a lower part of the cabinet.

17. The service equipment according to claim 13, wherein the closed cabinet is a wheeled cabinet.

* * * * *